United States Patent [19]

Pasbrig

[11] Patent Number: 4,759,476
[45] Date of Patent: Jul. 26, 1988

[54] VENTING APPARATUS FOR LIQUID-FILLED SYSTEMS

[75] Inventor: Max Pasbrig, Orselina, Switzerland

[73] Assignee: Lacrex Brevetti SA, Orselina/Ti, Switzerland

[21] Appl. No.: 147

[22] Filed: Jan. 2, 1987

[30] Foreign Application Priority Data

Jan. 11, 1986 [CH] Switzerland ............... 00060/86

[51] Int. Cl.⁴ ............................................. B67D 3/00
[52] U.S. Cl. ................................... 222/482; 251/278; 137/199; 222/518
[58] Field of Search ............... 222/482, 397, 518, 478; 137/199, 202, 197, 800; 251/276, 277, 278, 291

[56] References Cited

U.S. PATENT DOCUMENTS

| | | | |
|---|---|---|---|
| 1,517,459 | 12/1924 | Reiter | 137/202 |
| 2,452,956 | 11/1948 | Robins | 251/278 |
| 2,684,684 | 7/1954 | Stevenson | 137/199 |
| 2,740,421 | 4/1956 | Martin et al. | 251/277 |
| 4,467,827 | 8/1984 | Pasbrig | 137/199 |

Primary Examiner—Joseph J. Rolla
Assistant Examiner—Kenneth Noland
Attorney, Agent, or Firm—Werner W. Kleeman

[57] ABSTRACT

The venting apparatus for liquid-filled systems permits accumulated air to automatically escape from the system. The venting apparatus comprises a bottom member with an internal bore containing a spring-loaded plunger movable to open and close an air venting channel, and a top member with a protective cap. The air venting channel in the bottom member communicates with air exit openings leading to the ambient atmosphere.

9 Claims, 2 Drawing Sheets

VENTING APPARATUS FOR LIQUID-FILLED SYSTEMS

BACKGROUND OF THE INVENTION

The present invention broadly relates to a new and improved construction of an apparatus for venting liquid-filled systems.

In its more specific aspects the present invention relates to a new and improved construction of a venting apparatus for liquid-filled systems and comprises a lower or bottom member with an internal bore provided for an upwardly and downwardly displaceable, spring-loaded plunger. A venting channel communicates with at least one air exit opening and contains a central bore which may accommodate operating means for operating the plunger. The top member carries a protective cap.

An automatic venting apparatus of this type as described, for example, in German Patent No. 1,935,899, comprises an air compression chamber. A stepped plunger or piston controls or displaces the compressed air through an outlet opening, and the air exits or vents through small escape apertures in a protective cap. If there is no air present in the system, the compression chamber is filled with liquid instead of air. Upon a pressure increase, such liquid is forced by the plunger or piston through the small escape apertures into the ambient atmosphere or surroundings. This may result in clogging the small escape apertures due to dust depositions therein. Furthermore, the proper function of this automatic venting apparatus is dependent upon the presence of a number of seals at the plunger or piston and which seals are reciprocated conjointly with the plunger or piston in associated guide means. The seals are damaged by small foreign bodies or particles, and the plunger or piston is jammed which can result in non-operability of the venting apparatus.

In a further venting valve comprising a plunger or piston, the air outlet connector at the top member is constructed and arranged without protection, such that dust and foreign particles or bodies unobstructedly and directly may enter the valve and, due to deposition or corrosion, adhere at the plunger or piston and impair its function.

There exist still other known automatic venting apparatuses in which the plunger or pistons are provided with helical turns or grooves and otherwise are tightly guided in bores. Also in these apparatuses the function is impaired whenever small foreign particles or bodies are deposited in the turns or grooves and cause jamming of the plunger or piston.

SUMMARY OF THE INVENTION

Therefore, with the foregoing in mind it is a primary object of the present invention to provide a new and improved construction of a venting apparatus for liquid-filled systems and which does not exhibit the aforementioned drawbacks and shortcomings of prior art constructions.

A further significant object of the present invention is to provide a new and improved construction of a venting apparatus for liquid-filled systems and which venting apparatus is constructed of comparatively simple constructional components and yet ensures reliable venting substantially under all prevailing operating conditions.

Now in order to implement these and still further objects of the present invention, which will become more readily apparent as the description proceeds, the venting apparatus of the present development is manifested by the features that, the plunger possesses a stepped and substantially cylindrical configuration and is constructed as a closing member for the air venting channel. The plunger can be displaced into and out of a closing position relative to the air venting channel.

The venting apparatus for liquid-filled systems according to the invention is operable in any position. The movable plunger or piston automatically effects opening and closing of the air venting passage or channel. Upon opening, air which is present in the liquid-filled system, can escape into the ambient atmosphere through a space or gap defined between the plunger or piston and the wall of the internal bore in the lower or bottom member and this space or gap is dimensioned in correspondence to the viscosity of the liquid. As soon as the liquid level or column reaches the plunger or piston, pressure is built up due to backup or liquid dam-up at the space or gap and displaces the plunger or piston in an upward direction until the plunger or piston shuts off further discharge of air and thus prevents any escape of liquid. When a pressure drop occurs, the plunger or piston drops downwardly under its own weight and reopens the previously closed air venting passage or channel.

A predetermined number of air exit openings or apertures are radially arranged with respect to the air venting passage or channel and terminate in the sides or side surfaces of a polygon body of the upper or top member. The air exit openings or apertures are covered by a protective cap in order to protect the automatic venting apparatus against the entry or penetration of dirt and foreign particles or bodies. In this construction the air always can escape through at least one free space which exists between the sides or side surfaces of the polygon body and the inner wall of the protective cap. Air space is accomplished for instance through the free spaces which exist between the side surfaces of the polygon body of the upper member and free spaces which exist between the side surfaces of the likewise polygon body of the lower member and the inner wall of the protective cap.

BRIEF DESCRIPTION OF THE DRAWINGS

The invention will be better understood and objects other than those set forth above will become apparent when consideration is given to the following detailed description thereof. Such description makes reference to the annexed drawings wherein throughout the various figures of the drawings there have been generally used the same reference characters to denote the same or analogous components and wherein.

DETAILED DESCRIPTION OF THE PREFERRED EMBODIMENTS

Figure 1:
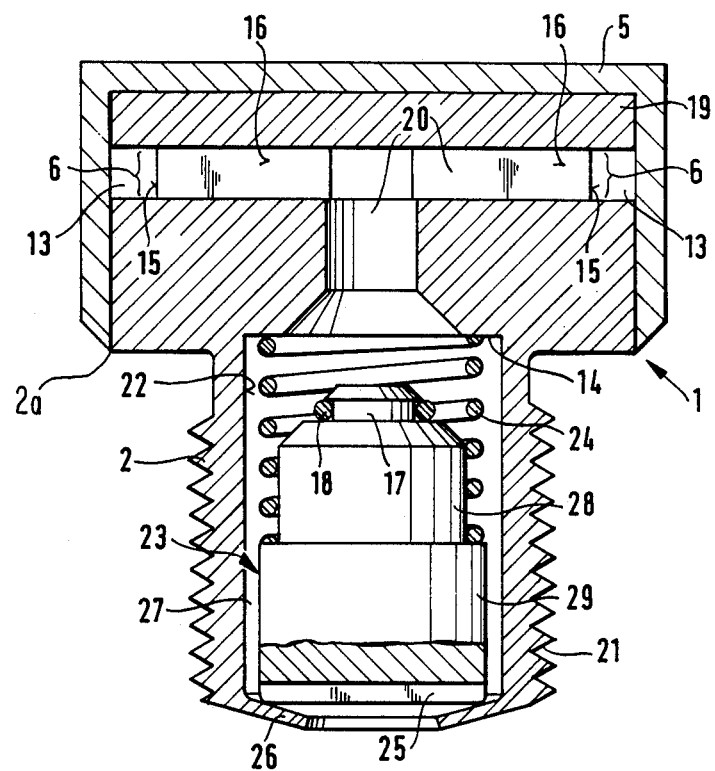
FIG. 1 shows a longitudinal section through a first exemplary embodiment of inventive automatic venting apparatus.

Describing now the drawings, it is to be understood that to simplify the showing thereof, only enough of the construction of the venting apparatus has been illustrated therein, as is needed to enable one skilled in the art to readily understand the underlying principles and concepts of the present invention. Turning now specifically to FIG. 1 of the drawings, the first exemplary embodiment of the inventive venting apparatus illustrated therein by way of example and not limitation will be seen to constitute an automatic venting apparatus which comprises a housing 1 with an upper or top member 19 containing a polygon or polygonal body 16. Air exit openings or apertures 6 are radially arranged with respect to an air venting passage or channel 20 and terminate in sides or side surfaces 15 of the polygon body or member 16. The air exit openings or apertures 6 are covered by a protective cap 5 which surrounds the upper or top member 19 in spaced relationship. Any air thus can escape into the open through at least one free space 13 which is formed between the protective cap 5 and the sides or side surfaces 15 of the polygon body or member 16.

This automatic venting apparatus further comprises a lower or bottom member 2 formed with an external thread 21 for placing such lower or bottom member 2 into threaded connection to the liquid-filled system to be monitored. A recessed internal bore 22 serves as or defines an air collection space or chamber 27. This lower or bottom member 2 has at its upper end or region a polygon body 2a arranged in the protective cap 5 and in relation to the polygon body 16 such that the free spaces 13 can flow and communicate with the ambient surroundings in order to expel this air.

An upwardly and downwardly moveable stepped plunger or piston 23 is arranged with radial play in the recessed internal bore 22 of the lower or bottom member 2. An upper or top portion 28 of the plunger or piston 23 contains a tapered, specifically substantially conically configured end 17 at which a sealing ring 18 is provided for sealing the air venting passage or channel 20. A lower or base portion 29 of the plunger or piston 23 has a smooth substantially cylindrical outer surface and contains grooves 25 at its bottom. The grooves 25 facilitate the access of air to the annular air collection space or chamber 27 which is formed between the lower or base portion 25 of the plunger or piston 23 and the wall of the internal bore 22 in the lower or bottom member 2 of the housing 1. The lower or base portion 25 of the piston or plunger 23 is supported by means of its bottom at an annular flange 26 of the lower or bottom member 2 of the housing 1.

A spring 24 is supported at the end face or surface or the lower or base portion 29 of the plunger or piston 23 and assists in the downward movement or displacement of the plunger or piston 23. Furthermore, the spring 24 loads or biases the plunger or piston 23 such that, upon application of liquid pressure to the plunger or piston 23, a closing period of time for the plunger or piston 23 can be predetermined as a function of the spring force (FIG. 1).

Figure 2:
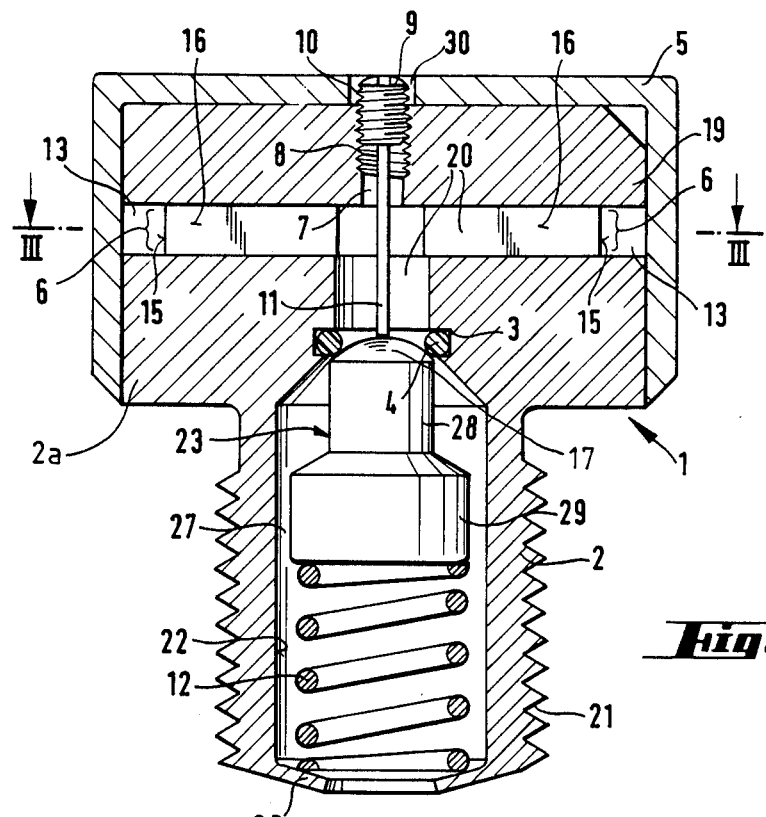
FIG. 2 shows a longitudinal section along the line II—II in FIG. 3 through a second exemplary embodiment of the inventive venting apparatus.
Figure 3:
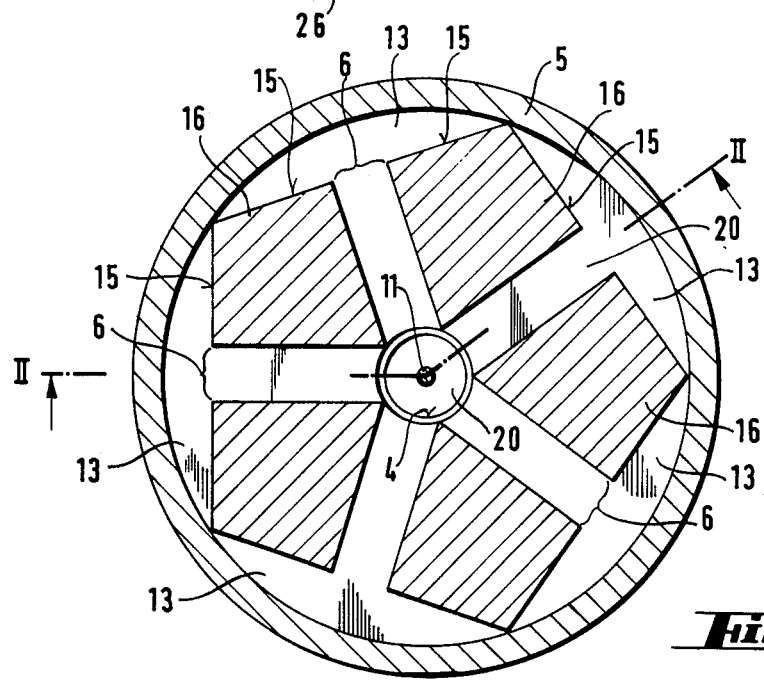
FIG. 3 shows a simplified cross-section through the inventive venting apparatus along the line III—III in FIG. 2.

A second exemplary embodiment of inventive venting apparatus is shown in FIG. 2. In this embodiment the stepped plunger or piston 23 is pressed, with its tapered end 17 and by means of a compression spring 12, against a sealing ring 4 which is located in an undercut 3 of the internal bore 22 in the lower or bottom member 2 of the housing 1. The air venting passage or channel 20 is thereby closed. A central bore 7 in the upper or top member 19 of the housing 1 contains a threaded bore portion 8 at its end which terminates in the end face or surface of the upper or top member 19. A spindle 11 has a cap or head 9 and a threaded nut or screw portion 10 which is arranged in engagement with the threaded bore portion 8 and thus is displaceably arranged in the central bore 7. The spindle 11 bears upon the spring-loaded stepped plunger or piston 23. The protective cap 5 contains a hole or bore 30 permitting access to and operation of the spindle 11 without removal of the protective cap 5.

In the presence of air in the liquid-filled system, the spindle 11 is manually operated so as to be displaced inwardly, whereby the spring-loaded stepped plunger or piston 23 is displaced or lifted off from the sealing ring 3. This can be accomplished, for instance, by allowing the upper end of the spindle 11 to extend into the region of the cap or head 9 where it is there accessible so that it may be selectively briefly actuated or depressed to thus open the spring-loaded plunger or piston 23 for venting purposes. The air venting passage or channel 20 is accessible at the associated opening and permits the air to escape through the air exit openings or apertures 6 into the ambient surroundings or atmosphere. If extended venting is required, for example, in the event of repair work at the liquid-filled system, the spindle 11 also can be conveniently fixed in desired position by rotating the threaded spindle portion 10 located at the region of the cap or head 9 within the threaded bore portion 8 in the central bore 7 of the upper or top member 19 of the housing 1. After completion of the venting operation, the spindle 11 can be released again as soon as liquid arrives instead of air. The compression spring 12, then, returns the plunger or piston 23 into the closed position.

While there are shown and described present preferred embodiments of the invention, it is to be distinctly understood that the invention is not limited thereto, but may be otherwise variously embodied and practiced within the scope the following claims. ACCORDINGLY,

What I claim is:

1. A venting apparatus for liquid-filled systems, comprising:
    a bottom member containing an internal bore;
    an upwardly and downwardly displaceable, spring-loaded plunger accommodated in said internal bore of said bottom member;
    said bottom member containing an air venting channel leading to at least one air exit opening;
    a protective cap;
    a top member carrying said protective cap;
    said plumger constituting a closing member for said air venting channel;
    said plunger being respectively displaceable into and out of a closing position with respect to said air venting channel in said internal bore of said bottom member under the action of liquid pressure in the liquid-filled system against the force of said spring and under the force of said spring load;
    said top member comprising a polygon body containing a predetermined number of side surfaces;
    said protective cap surrounding in spaced relationship said polygon body of said top member;

said polygon body and said top member defining at least one free space therebetween; and said protective cap covering said polygon body of said top member and being arranged such that said at least one air exit opening is covered in a spaced relationship and the air is permitted to escape through said at least one free space defined by said polygon body and said top member.

2. The venting apparatus as defined in claim 1, wherein:

said spring-loaded plunger comprise a compression spring loading said plunger.

3. The venting apparatus as defined in claim 1, wherein said plunger possesses a stepped, substantially cylindrical configuration.

4. The venting apparatus as defined in claim 1, wherein:

said plunger possesses a tapered end and a base
a sealing ring;
said sealing ring being arranged at said tapered end of said plunger; and
said base portion of said plunger being provided with at least one groove.

5. The venting apparatus as defined in claim 4, wherein:

said tapered end of said plunger has a substantially conical configuration.

6. The venting apparatus as defined in claim 4, wherein:

said base portion of said plunger and said internal bore in said bottom member define an annular space;
said internal bore of said bottom member defining an air collection space; and
said annular space communicating with said air collection space.

7. The venting apparatus as defined in claim 1, wherein:

said top member comprises a polygon body containing a predetermined number of side surfaces;
each said air exit opening extending substantially radially with respect to said air venting channel; and
each said air exit opening terminating in said side surfaces of said polygon body.

8. The venting apparatus as defined in claim 1, further including:

a housing; and
said top member said bottom member constituting members of said housing.

9. The venting apparatus as defined in claim 1, wherein:

said bottom member includes a polygon body.

* * * * *

UNITED STATES PATENT AND TRADEMARK OFFICE
CERTIFICATE OF CORRECTION

PATENT NO. : 4,759,476
DATED : July 26, 1988
INVENTOR(S) : MAX PASBRIG

It is certified that error appears in the above-identified patent and that said Letters Patent is hereby corrected as shown below:

Column 4, line 57, please delete "plumger" and insert --plunger--

Column 5, line 21, after "base" please insert --portion;--

Signed and Sealed this

Thirteenth Day of December, 1988

Attest:

DONALD J. QUIGG

*Attesting Officer*  *Commissioner of Patents and Trademarks*